(12) United States Patent
Madter

(10) Patent No.: US 7,290,090 B2
(45) Date of Patent: *Oct. 30, 2007

(54) CACHE OPERATION WITH NON-CACHE MEMORY

(75) Inventor: Richard C. Madter, Puslinch (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/603,799

(22) Filed: Nov. 22, 2006

(65) Prior Publication Data

US 2007/0094451 A1  Apr. 26, 2007

Related U.S. Application Data

(63) Continuation of application No. 10/852,049, filed on May 24, 2004, now Pat. No. 7,159,076.

(51) Int. Cl.
*G06F 12/08* (2006.01)

(52) U.S. Cl. .................. 711/118; 711/138; 711/144

(58) Field of Classification Search ................ None
See application file for complete search history.

(56) References Cited

U.S. PATENT DOCUMENTS

| 5,247,642 | A | 9/1993 | Kadlec et al. |
| 5,455,957 | A | 10/1995 | Pawlowski et al. |
| 5,751,996 | A | 5/1998 | Glew et al. |
| 5,956,753 | A | 9/1999 | Glew et al. |
| 5,974,501 | A | 10/1999 | Shaver et al. |
| 6,260,127 | B1 | 7/2001 | Olarig et al. |
| 6,505,282 | B1 | 1/2003 | Langendorf et al. |
| 6,530,007 | B2 | 3/2003 | Olarig et al. |
| 6,804,760 | B2 | 10/2004 | Wiliams |
| 2003/0018877 | A1 | 1/2003 | Gaskins et al. |
| 2003/0070052 | A1 | 4/2003 | Lai |

*Primary Examiner*—Kevin Verbrugge
(74) *Attorney, Agent, or Firm*—Jones Day; Krishna K. Pathiyal; Robert C. Liang

(57) ABSTRACT

A system and method are provided for bypassing cache memory when reading data from system memory particularly when the primary memory could include memory types where the read operation mixes non-data with data. A system and method are provided for bypassing and invalidating cache memory when writing data to system memory particularly when the primary memory could include memory types where the write operation mixes non-data with data.

20 Claims, 5 Drawing Sheets

CACHE OPERATION WITH NON-CACHE MEMORY

CROSS-REFERENCE TO RELATED APPLICATIONS

This application claims priority as a continuation application to U.S. patent application Ser. No. 10/852,049 entitled "Cache Operation With Flash Memory," which was filed on May 24, 2004, now U.S. Pat. No. 7,159,076. The entire disclosure of U.S. patent application Ser. No. 10/852,049 is hereby incorporated into the present application by reference.

BACKGROUND

1. Field

The systems and methods described in this patent document relate generally to memory systems and more specifically to the interaction of logic devices with memory systems that include cache memory.

2. Description of the Related Art

Many electrical or computer systems exist that comprise logic devices, such as micro-processors, micro-controllers, and others, that utilize system memory that comprises both a primary memory subsystem and a cache memory subsystem. Cache subsystems are typically used to decrease the access time for a logic device to acquire information stored in memory. It is desirable for the cache to hold data that has a high probability of being wanted next by the processor so less time is spent accessing the other memory, such as the primary memory, which may have a longer access time than the cache memory.

In many systems data retrieved from primary memory is written to cache memory such that this data may be retrieved from cache memory instead of from the primary memory the next time it is required by the logic device. Thus, the cache memory may be checked for data prior to performing a read of the primary memory and data is written to the cache memory after a write to the primary memory.

In some systems all or part of the cache memory is disabled when the primary non-fast read-write memory is being accessed for its status or configuration. Sometimes this disabling is limited to that part of the cache memory that shadows the non-fast read-write memory. In some systems a software process locates and then invalidates any lines in the cache memory that correspond to the part of the non-fast read-write memory that was programmed. Also, in some systems the whole cache memory is invalidated when part of the non-fast read-write memory is being programmed.

The invalidation of lines of cache memory is also performed in some multi-processor systems. In these systems the processors often share a common primary memory. For example, processor A writes to the shared primary memory. This data is then read by processor B and written to the cache memory in processor B. Upon a subsequent write of data to the same location of primary memory by processor A the previous data in the cache memory of processor B must be invalidated. In these cases "snooping" of the memory bus used to communicate with the primary memory is often performed to monitor accesses to the primary memory. The corresponding line of cache memory in the respective cache memory is then invalidated.

SUMMARY

A system and method are provided for using cache memory when reading data from system memory particularly when the primary memory could include memory types other than fast read-write memory. Also, a system and method are provided for using cache memory when writing data to system memory particularly when the primary memory could include memory types other than fast read-write memory.

Some of the claims provide a method for writing data to non-cache memory in a system having cache memory comprising the steps of initiating a write operation so that data can be written to a location in non-cache memory, obtaining information for use in identifying the memory type of the non-cache memory location to which the write operation is directed, and determining whether the non-cache memory location to which the write operation is directed comprises a fast read-write memory type. The method further comprises the steps of identifying whether a line in system cache memory exists whose contents mirrors the content of the non-cache memory location to which the write operation is directed if the non-cache memory location to which the write operation is directed does not comprise a fast read-write memory type, determining whether the system has designated the line in system cache memory as being valid if the line is identified, invalidating the line in system cache memory if both the line is identified and if the system had designated the line as being valid, and writing data to the non-cache memory.

Also, some of the claims provide a method for reading data from non-cache memory in a system having cache memory comprising the steps of initiating a read operation, obtaining memory type information for use in identifying the memory type of the non-cache memory location to which the read operation is directed, and determining whether the non-cache memory is a fast read-write memory type. The method further comprises the steps of determining whether the cache is to be bypassed if the non-cache memory is not a fast read-write memory type, determining whether the desired data is in the cache if the cache is not to be bypassed, reading the desired data from the cache if it is determined that the desired data is in the cache, and reading the desired data from the non-cache memory if it is determined that the desired data is not in the cache or if it is determined that the cache is to be bypassed.

Some claims are directed to an electronic system comprising a cache memory subsystem, a non-cache memory subsystem and a logic device that is operative to read data from the cache memory subsystem and from the non-cache memory subsystem.

Still other claims are directed to an electronic system comprising a cache memory subsystem, a non-cache memory subsystem, and a logic device that is operative to write data to the cache memory subsystem and to the non-cache memory subsystem.

DETAILED DESCRIPTION

Figure 1A:
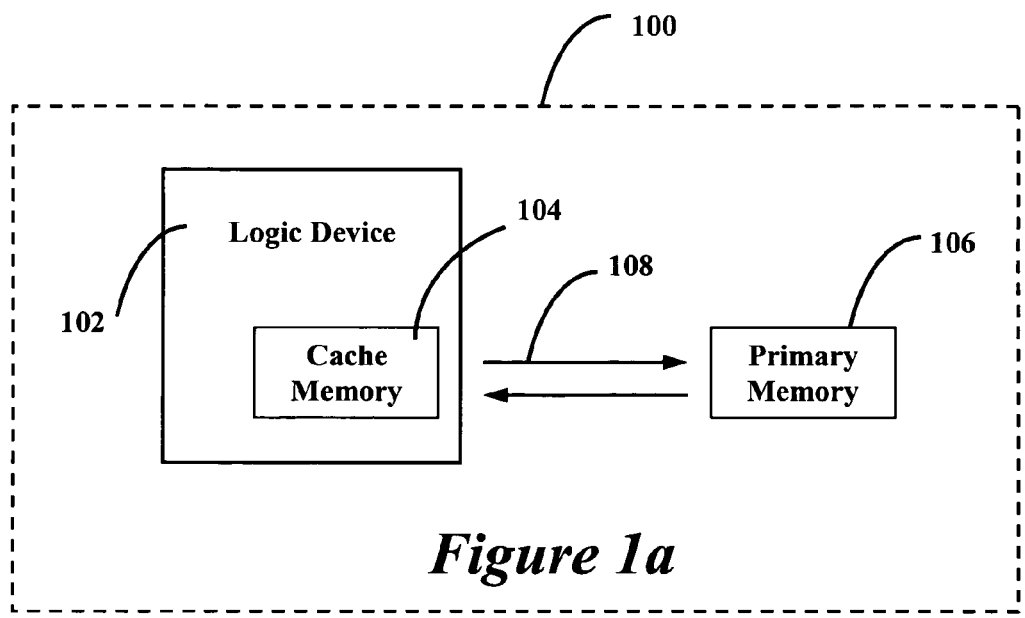
FIG. 1a is a schematic diagram of an exemplary logic device-memory arrangement.

Shown in FIG. 1a is an exemplary configuration of electronic or computer system 100 that has both primary and cache memory subsystems. The exemplary system 100 comprises a logic subsystem 102, a cache memory subsystem 104 and a primary memory subsystem 106. The logic subsystem may comprise one or more logic devices including, but not limited to a microprocessor, micro-controller, programmable logic device, and others. In the exemplary system shown, the cache memory subsystem 104 physically resides in the logic subsystem 102, and the cache memory subsystem 104 and the logic subsystem 102 are coupled together such that they are in communication with each other. Shown in FIG. 1a is a single cache memory system 104, but the system 100 could include multiple cache memory subsystems. The primary memory subsystem 106 is connected to and communicates with the logic device subsystem 102 via a primary memory communications link 108. The primary memory communications link 108 provides a signal path for the transmission of data between the logic device subsystem 102 and primary memory subsystem 106.

Figure 1B:
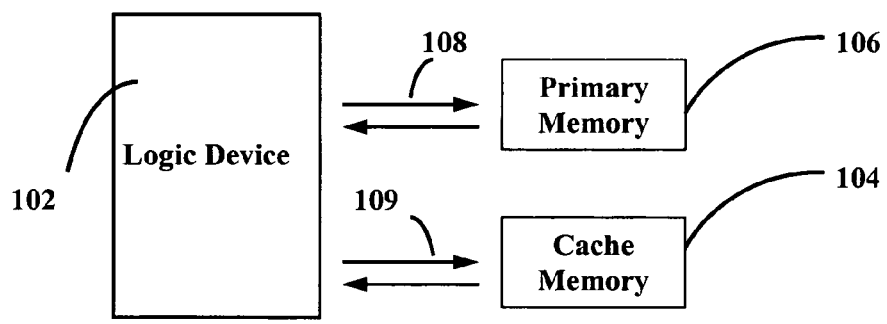
FIG. 1b is a schematic diagram of another exemplary logic device-memory arrangement.
Figure 1C:
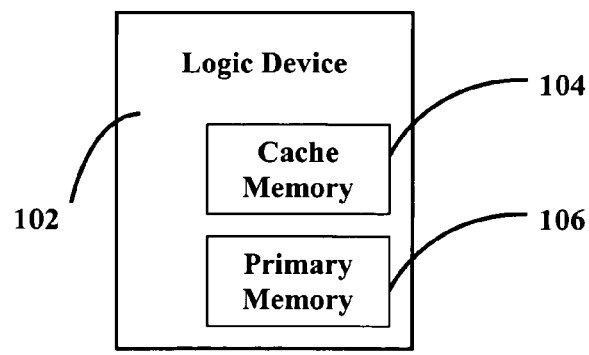
FIG. 1c is a schematic diagram of a third exemplary logic device-memory arrangement.

Shown in FIGS. 1b and 1c are additional exemplary configurations of electronic or computer systems that comprise a logic subsystem 102, a cache memory subsystem 104 and a primary memory subsystem 106. In FIG. 1b, the cache memory subsystem 104 and the primary memory subsystem 106 are shown as being physically located external to the logic subsystem 102. A primary memory communications path 108 provides for communications between the logic subsystem 102 and the primary memory subsystem 106 and a cache memory communications path 109 provides for communications between the logic subsystem 102 and the cache memory subsystem 104. As illustrated in FIG. 1c, both the cache memory subsystem 104 and the primary memory subsystem 106 optionally could physically reside within the logic subsystem 102.

The primary memory subsystem 106 could comprise types of fast read-write memory, such as SRAM, DRAM, MRAM and others. The primary memory subsystem 106 could also comprise other types of memory devices that are not fast read-write memory, such as CCD memory, FLASH memory, EEPROM, EPROM, ROM and others. Fast read-write memories generally have simple one step read modes and simple one step write modes. The memory types that are not fast read-write memory types generally have multi-step write modes and often have special operating modes that include status and configuration parameter modes. These special operating modes may provide for erasing, programming or reading of Status and Configuration parameters.

Because the primary memory subsystem 106 could comprise types of fast read-write memory and/or types of memory devices that are not fast read-write memory, the system 100 should have a method for allowing the cache memory subsystem 104 to load data from primary memory subsystem 106 that may comprise fast read-write memory and/or types of memory devices that are not fast read-write memory so that the cache memory subsystem 104 can mirror portions of the primary memory 106. The types of memory devices that are not fast read-write memory provide considerations that do not exist for fast read-write memories, for example, because of the special operating and multi-step write modes associated with memory devices that are not fast read-write memory devices. If the procedures typically followed when the primary memory consists of only fast read-write memory were followed when the primary memory consists of memory devices that are not fast read-write memory devices, a given line of cache memory that is intended to mirror a line in the primary memory may become incorrect due to the sequence of steps that occurs during a multi-step writing mode or special operating mode operation.

Figure 2A:
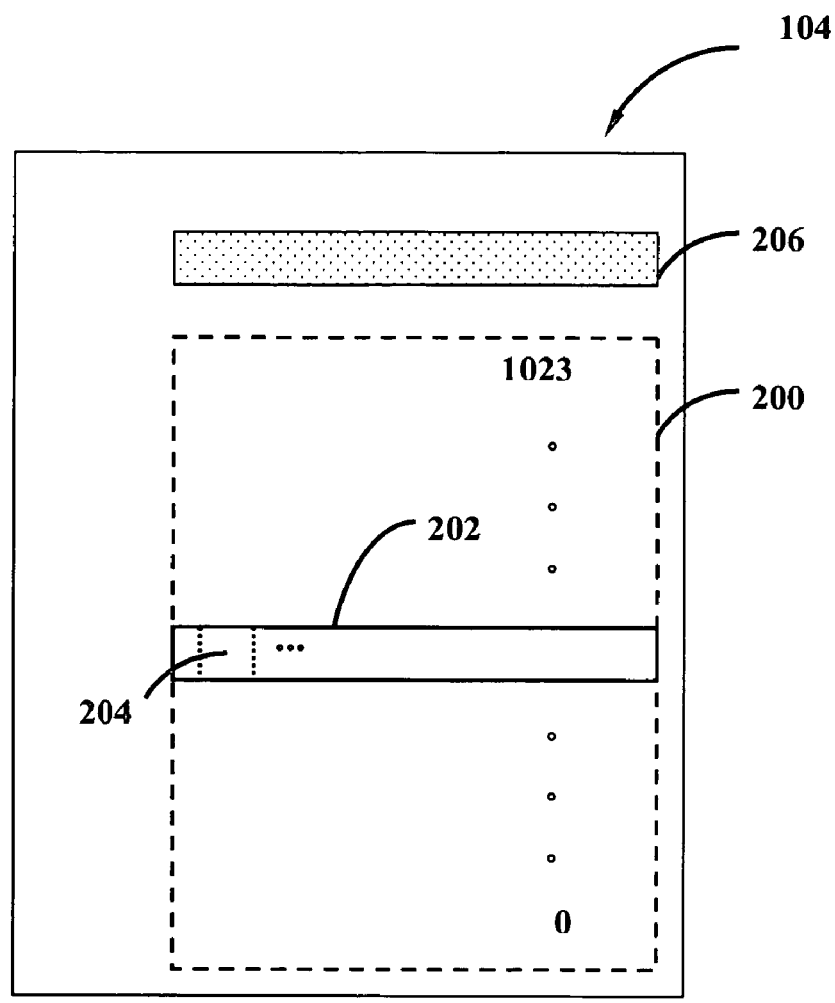
FIG. 2a is a schematic diagram of an exemplary cache memory arrangement.

FIG. 2a is a schematic diagram of an exemplary cache memory subsystem 104. The exemplary cache memory subsystem 104 comprises a memory array 200. The memory array 200 in this example is able to store 16K bytes of data. The exemplary memory array 200 is organized into a plurality of lines of memory 202 and in this example there are 1K (1023:0) lines of memory 202. A plurality of bits 204 may be stored in each of the lines of memory 202. The exemplary cache memory 104 also comprises a cache configuration register 206. The exemplary cache configuration register 206 contains global control bits that could be used to disable the caching of instructions, data or both and other control bits for identifying and controlling memory devices that are not fast read-write memory such as flash memories.

Figure 2B:
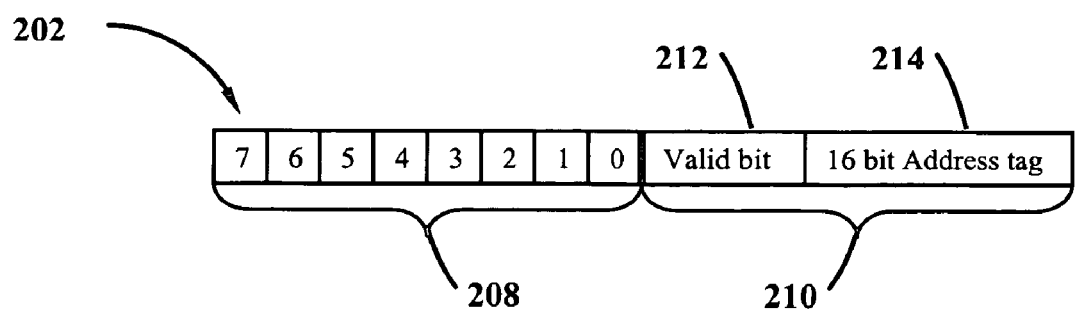
FIG. 2b is a schematic diagram of an exemplary line of data from the exemplary cache memory arrangement.

Shown in FIG. 2b is an exemplary line of memory 202. The exemplary line of memory 202 comprises a data portion 208 and a tag entry portion 210. The data portion 208 in this example is capable of storing 16 bytes of data, which is generally organized as eight (7:0) two byte words. The tag entry portion 210 in this example stores 16 address bits (A29:A14) 214 and one valid bit 212. The cache memory 104 in this example is direct mapped. Therefore, on a logic device read, the read address bits A13:A4 select the appropriate line of memory/tag entry and the read address bits A3:A0 select the data, appropriate byte, word or double word, within the line of memory. The data in the line of cache memory addressed by A13:A4 is the required data for the access to the primary memory 106 if the corresponding tag entry 214 matches the top read address bits A29:A14 and the valid bit 212 is true. As an alternative to the direct mapped cache memory of this example, other embodiments may optionally have 2, 4, . . . N sets of cache memory for 2, 4, . . . N way associativity.

During a first read operation mode, as would occur when the primary memory subsystem 106 comprises fast read-write memory, the cache memory subsystem 104 is checked for the data requested by the logic subsystem 102. This check is performed so that the logic subsystem 102 can avoid a read of the primary memory subsystem 106 if possible. If the requested data is not present in the cache memory subsystem 104 the data is read from the primary memory subsystem 106. If data is read from the primary memory subsystem 106 the data is written to the cache memory subsystem 104 after the read operation so that it may be available for subsequent reads. Because the primary memory subsystem 106 is cached, it is preferable that the logic subsystem 102 is the device that modifies the contents of the primary memory subsystem 106. This write operation is also used by the cache controller to update the line of cache memory 202 at the same time, if the tag entry portion 210 is valid, e.g. the valid bit 212 is equal to 1 and the address tag 214 matches the address within the primary memory subsystem 106 to which writing is to occur. This ensures that the data in the cache memory subsystem 104 mirrors data in the primary memory subsystem 106.

When the primary memory subsystem 106 comprises a memory type that is not fast read-write memory, such as flash memory 106, a different read operation mode may be implemented. For example, with flash memory 106, it is desirable to determine if the flash memory is operating in a special operating mode, by requesting the operational status of the flash memory 106, which can be determined by reading data located on a particular line of the flash memory 106. The cache memory 202 may contain valid data corresponding to data stored in the flash memory. But, it is desirable to temporarily bypass the cache memory 202 so that the flash memory 106 can be accessed directly to obtain the flash memory's status values.

Figure 3A:
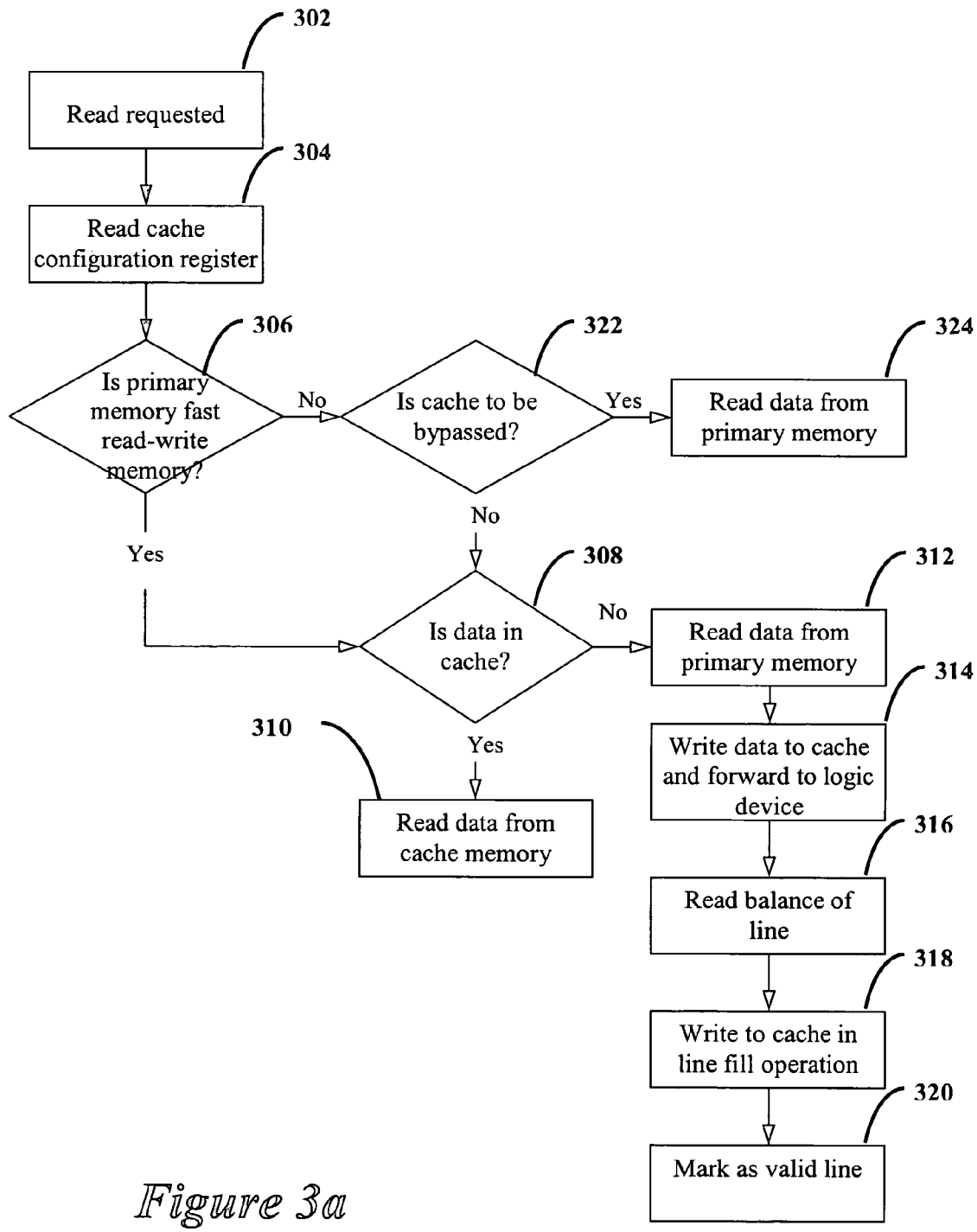
FIG. 3a is a flow chart of an exemplary method for executing a read operation.

Shown in FIG. 3a is an exemplary process used by a logic device to read data. In this process, a read operation is requested at step 302. This read request may be made to either request data or to request a status word from the primary memory subsystem 106. Memory status is typically required during Erase and Programming operations of memory devices such as flash memory. At step 304 the cache configuration register 206 is queried to determine the memory type and/or the bypass state setting of the read request.

In this example, the bypass state is determined by the value of control bits in the cache configuration register 206. Generally, the control bits are set to indicate the bypass state when Erase and Programming operations are taking place. These control bits can be temporarily set to indicate the bypass state to prevent the primary memory subsystem 106 from being cached. Thus, the shadowing of the primary memory subsystem 106 by the cache memory subsystem 104 can be bypassed. This prevents the logic device from reading cache memory data when current primary memory status information is required. Thus, the cache configuration register 206 is set such that the cache memory subsystem 104 is bypassed on reads to the primary memory subsystem 106 when the read request is for a status word.

At step 306 one of two paths are traversed depending on whether the portion of the primary memory to which the read request is directed is fast read-write memory. If the portion of the primary memory subsystem 106 comprises fast read-write memory, then the process moves to step 308, where a determination is made as to whether the requested data is in the cache memory subsystem 104. If the requested data is in the cache memory subsystem 104, e.g. the tag address associated with a line of cache memory 202 matches the read address of the line of primary memory and the valid bit 212 is true, then the process proceeds to step 310 where the data is read from the cache memory subsystem 104.

If the requested data was not in the cache memory subsystem 104, then the process proceeds to step 312 where the data is read from the primary memory subsystem 106. Next, at step 314 the data read from the primary memory subsystem 106 is stored in the corresponding line of the cache memory subsystem 104 and is returned to the logic subsystem 102. At step 316 the remaining words of the line that is being written to the cache memory subsystem 104 are read from the primary memory subsystem 106. At step 318 these additional words are written to the line of cache memory 202 in a line fill operation. Steps 316 and 318 are provided because lines of the cache memory subsystem 104 in many systems may only be marked as full or empty. At step 320 the line of cache memory 202 is marked as valid by setting the valid bit 212 within the appropriate tag entry 210 to a value of 1.

If at step 306 it was determined that the portion of the primary memory to which the read request was directed was not fast read-write memory, then the process moves to step 322 where a decision is made regarding the bypass state, e.g. whether the cache memory subsystem 104 is to be bypassed. If the cache memory subsystem 104 is to be bypassed, the process moves to step 324 where the primary memory subsystem 106 is read directly.

If the cache memory subsystem 104 is not to be bypassed, the process moves to step 308 where a determination is made as to whether the requested data is in the cache memory subsystem 104. If the requested data is in the cache memory subsystem 104, then the process proceeds to step 310. Otherwise the process proceeds to step 312.

Steps 312 to 320 also facilitate the primary memory subsystem's 106 wrap mode operation. In wrap mode the location requested by the logic device is read first followed by the remaining words (ex. 3, 4, 5, 6, 7, 0, 1, 2) which may need to wrap to fill in words in the cache line after the first read.

Figure 3B:
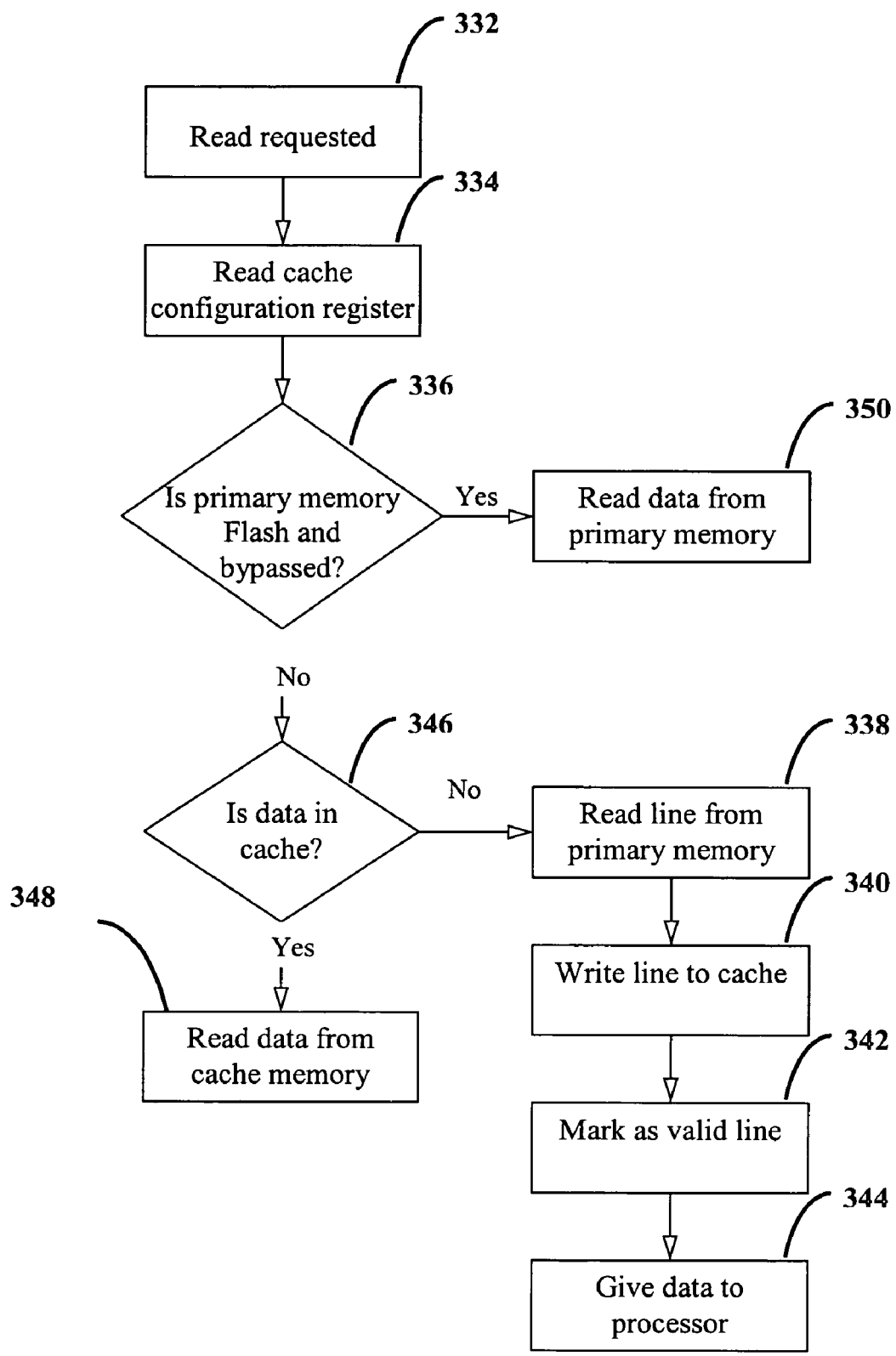
FIG. 3b is a flow chart of another exemplary method for executing a read operation.

A second exemplary read process is presented in FIG. 3b. At steps 332 and 334, respectively, a read request is made and the cache configuration register 206 is queried to determine the memory type and the bypass state setting of the read request. At step 336, a decision is made for the process to either continue to step 350 if the memory type is not fast read-write memory and if the cache is to be bypassed or to otherwise continue to step 346. If the process proceeds to step 350, data is read directly from the primary memory subsystem 106.

If the process proceeds to step 346, a determination is made as to whether the requested data is in the cache memory subsystem 104. If the requested data is in the cache memory subsystem 104, then the process proceeds to step 348 where the data is read from the cache memory subsystem 104. If the requested data was not in the cache memory subsystem 104, then the process proceeds to step 338 where a line of data is read from the primary memory subsystem 106.

If the process proceeded to step 338, in the next step (at step 340) the data read from the primary memory subsystem 106 is stored in the corresponding line of the cache memory subsystem 104. At step 342, the line of cache memory 202 is marked as valid. At step 344, the data is provided to the logic subsystem 102.

Figure 4:
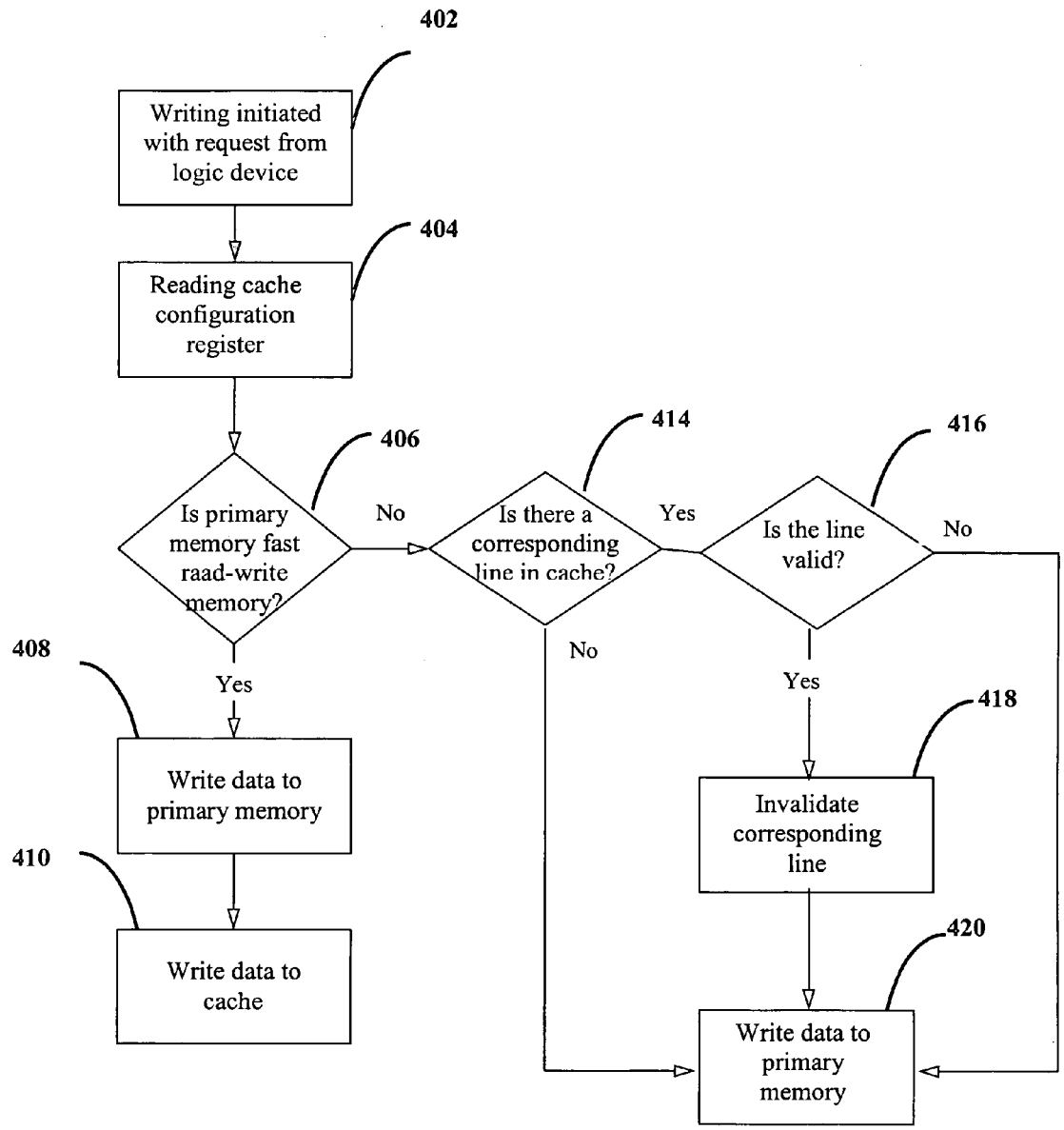
FIG. 4 is a flow chart of an exemplary method for executing a write operation.

Shown in FIG. 4 is an exemplary write operation sequence. With primary memory that does not comprise fast read-write memory such as flash memory, writing a data word into the memory may involve 2 to 6 write operations. During the write operations, data that is written to the memory at various stages in the process can be either programming instructions or data values. The cache memory subsystem 104, however, may not be able to differentiate between the data values and the programming instructions. Thus, if the write data is stored in the cache memory subsystem 104, including the appropriate programming information, a subsequent read of the cache memory subsystem 104 may read programming instructions instead of the desired data. Therefore memories that are designated, for example in the cache configuration register 206, as not being fast read-write memory can be treated differently during a write operation for proper subsequent reading of data.

At step 402 of the exemplary write operation sequence illustrated in FIG. 4, a write to the primary memory subsystem 106 is initiated with a request from the logic subsystem 102. Next, at step 404 the cache configuration register 206 is queried to determine the memory type of the memory to which the write request is directed. At step 406, a determination is made regarding whether the memory to which the write request is directed is a fast read-write memory.

If it is determined that the memory to which the write request is directed is fast read-write memory, the process moves to step 408 where the data is written to the primary memory subsystem 106. Next, at step 410, the data is written to the cache memory subsystem 104 if the line of cache memory 202 corresponding to the write address has a matching tag address 214 and the valid bit 212 is set. Writing to primary memory preferably causes a write to the cache memory subsystem 104 if the line, accessed by the lower address bits, has a valid tag that matches the upper address bits. Otherwise the write is storing data to some other primary memory location. When an invalid line of cache memory is found, data is not written to the cache memory subsystem 104.

If it is determined at step 406 that the memory to which the write request is directed is not fast read-write memory, the process moves to step 414 where a determination is made regarding whether there is a corresponding line of cache memory 202. There may be a corresponding line of cache memory, for example, when the tag address bits match those of the line of primary memory to which writing is to occur. If it is determined that there is not a corresponding location in cache memory 202, then the process proceeds to step 420 where the data is written to the primary memory 106.

If it is determined that there is a corresponding location in cache memory 202, then a determination is made, at step 416, regarding whether the system has designated the line of cache memory 202 as being valid (e.g., whether the valid bit is true). The line of cache memory 202 can have an address that matches that of the line of the primary memory to which writing is to occur when, for example, the line of primary memory was previously read and the data was written to the cache memory subsystem 104. If the line of cache memory 202 has not been designated as being valid, the process proceeds to step 420 where the data is written to the primary memory 106. If the line of cache memory 202 has been designated as being valid, the process proceeds to step 418 where the corresponding line of cache memory 202 is marked invalid. The process then proceeds to step 420 where the data is written to the primary memory 106.

The invalidation of a line of cache memory 202 could optionally be accomplished by setting the valid bit 212 of the tag entry 210 to the value 0. In this example, the valid bit 212 has a value of 0 or false when the line of cache memory 202 is invalid and a value of 1 or true when the line of cache is valid. By invalidating the line of cache memory 202, later read accesses to the corresponding line of the flash memory 106 that is being modified (Erased or Programmed) will not result in a line of the cache memory 202 being read that no longer has data that corresponds to the data in the corresponding line of primary memory. Instead, the read operation will result in a direct access of the flash memory 106, in this example.

Data written to the primary memory subsystem 106 at step 420 is not written to the cache memory subsystem 104. Therefore, there is no corresponding write to the cache memory subsystem 104 for all writes to the primary memory subsystem 106 where the primary memory subsystem 106 is a non-fast read-write memory. Bits in the cache configuration register 206 specify which memory devices are non-fast read-write memory devices.

In another example, data to be written to the primary memory subsystem 106 may be placed in a write buffer while the cache memory subsystem 104 is checked for a line representing the location in the primary memory subsystem 106. If such a line is found, the line is marked invalid as the corresponding location in the primary memory subsystem 106 is being changed.

In another example, the step of invalidating the line of cache memory 202 is accomplished by assigning a non-occurring address tag to the line of cache memory 202. In the above case, a valid bit is no longer necessary in the line of cache memory 202.

In the illustrated examples, the preferred non-fast read-write memory was flash memory, however, other memory types such as EEPROM, PROM, ROM, CCD, and others could have been used.

The structural arrangements and steps described herein and shown in the drawings are examples of structures, systems, or methods having elements or steps corresponding to the elements or steps of the invention recited in the claims. This written description and drawings may enable those skilled in the art to make and use embodiments having alternative elements or steps that likewise correspond to the elements or steps of the invention recited in the claims. The intended scope of the invention thus includes other structures, systems, or methods that do not differ from the literal language of the claims, and further includes other structures, systems, or methods with insubstantial differences from the literal language of the claims.

I claim:

1. A method for writing data to non-cache memory in a system having cache memory comprising the following steps:
   determining that a non-cache memory location to which a write operation is directed does not comprise a fast read-write memory type;
   determining if a line in system cache memory corresponds to the non-cache memory location to which the write operation is directed;
   if a corresponding line in system cache memory exists, determining if the line in system cache memory is valid;
   invalidating the line in system cache memory if the line in system cache memory is valid; and
   writing data to the non-cache memory.

2. The method according to claim 1 wherein the determining that a non-cache memory location to which a write operation is directed does not comprise a fast read-write memory type step comprises the step of accessing a cache configuration register to obtain memory type information.

3. The method according to claim 1 wherein the non-cache memory comprises a fast read-write memory type.

4. The method according to claim 1 wherein the non-cache memory does not comprise a fast read-write memory type.

5. The method according to claim 1 wherein the step of invalidating the line of cache memory includes the step of setting the value of a valid bit within the line of cache memory to 0.

6. The method according to claim 1 wherein the step of invalidating the line of cache memory includes the step assigning a non-occurring address tag to the line of cache memory.

7. A method for reading data from non-cache memory in a system having cache memory comprising the following steps:
   determining whether a non-cache memory location to which a read operation is directed is a fast read-write memory type;

determining whether the cache is to be bypassed if the non-cache memory location is not a fast read-write memory type;

determining whether the desired data is in the cache if the cache is not to be bypassed;

reading the desired data from the cache if it is determined that the desired data is in the cache; and reading the desired data from the non-cache memory location if it is determined that the desired data is not in the cache or if it is determined that the cache is to be bypassed.

8. The method according to claim 7 wherein the determining whether a non-cache memory location to which a read operation is directed is a fast read-write memory type step comprises the step of accessing a cache configuration register to obtain memory type information.

9. The method according to claim 7 wherein the step of determining whether the cache is to be bypassed comprises the step of obtaining bypass state setting information that indicates whether the cache memory is to be bypassed for that non-cache memory location.

10. The method according to claim 9 wherein the step of obtaining bypass state setting information comprises the step of accessing a cache configuration register to obtain the bypass state setting information.

11. The method according to claim 7 wherein the non-cache memory is not a fast read-write memory type and the requested data is read from the cache memory.

12. The method according to claim 7 wherein the non-cache memory is a fast read-write memory type and the requested data is read from the cache memory.

13. The method according to claim 7 wherein the non-cache memory is not a fast read-write memory type and the requested data is read from the non-cache memory.

14. The method according to claim 13 further comprising the following steps:

writing the data to a line of the cache memory after reading the data from the primary memory;

reading information in addition to the requested data contained in a line of the primary memory that contained the requested data;

writing the additional information to the line of the cache memory; and marking the line of the cache memory as valid.

15. The method according to claim 7 wherein the non-cache memory is a fast read-write memory type and the requested data is read from the non-cache memory.

16. The method according to claim 15 further comprising the following steps:

writing the data to a line of the cache memory after reading the data from the primary memory;

reading information in addition to the requested data contained in a line of the primary memory that contained the requested data;

writing the additional information to the line of the cache memory; and marking the line of the cache memory as valid.

17. A system having cache memory and non-cache memory comprising:

means for determining whether a non-cache memory location to which a write operation is directed comprises a fast read-write memory type;

means for identifying whether a line in system cache memory exists whose contents mirrors the content of the non-cache memory location to which the write operation is directed if the non-cache memory location to which the write operation is directed does not comprise a fast read-write memory type;

means for determining whether the system has designated the line in system cache memory as being valid if the line is identified;

means for invalidating the line in system cache memory if the line is identified and if the system had designated the line as being valid; and means for writing data to the non-cache memory.

18. The system according to claim 17 wherein the means for determining whether a non-cache memory location to which a write operation is directed comprises a fast read-write memory type comprises a cache configuration register.

19. A system having cache memory and non-cache memory comprising:

means for determining whether a non-cache memory location to which a read operation is directed is a fast read-write memory type;

means for determining whether the cache is to be bypassed if the non-cache memory is not a fast read-write memory type;

means for determining whether the desired data is in the cache if the cache is not to be bypassed;

means for reading the desired data from the cache if it is determined that the desired data is in the cache; and means for reading the desired data from the non-cache memory if it is determined that the desired data is not in the cache or if it is determined that the cache is to be bypassed.

20. The system according to claim 19 wherein the means for determining whether a non-cache memory location to which a read operation is directed is a fast read-write memory type comprises a cache configuration register.

* * * * *

UNITED STATES PATENT AND TRADEMARK OFFICE
CERTIFICATE OF CORRECTION

PATENT NO. : 7,290,090 B2
APPLICATION NO. : 11/603799
DATED : October 30, 2007
INVENTOR(S) : Richard C. Madter It is certified that error appears in the above-identified patent and that said Letters Patent is hereby corrected as shown below:

Related U.S. Application Data, please replace "now Pat. No. 7,159,076." with -- now Pat. No. 7,159,076, which claims the benefit of U.S. Provisional Application No. 60/482,180, filed on Jun. 24, 2003. --

Column 1, line 10, please replace "now U.S. Pat. No. 7,159,076." with -- now U.S. Pat. No. 7,159,076, which claims the benefit of U.S. Provisional Application No. 60/482,180 entitled Cache Operation With Flash Memory, which was filed on Jun. 24, 2003. --

Signed and Sealed this

Seventh Day of July, 2009

JOHN DOLL
*Acting Director of the United States Patent and Trademark Office*